(12) United States Patent
Aaltonen

(10) Patent No.: US 8,595,851 B2
(45) Date of Patent: Nov. 26, 2013

(54) MESSAGE DELIVERY MANAGEMENT METHOD AND SYSTEM

(75) Inventor: Janne Aaltonen, Turku (FI)

(73) Assignee: Apple Inc., Cupertino, CA (US)

( * ) Notice: Subject to any disclaimer, the term of this patent is extended or adjusted under 35 U.S.C. 154(b) by 1191 days.

(21) Appl. No.: 12/154,414

(22) Filed: May 22, 2008

(65) Prior Publication Data

US 2008/0295139 A1    Nov. 27, 2008

Related U.S. Application Data

(60) Provisional application No. 60/931,398, filed on May 22, 2007.

(51) Int. Cl.
    *H04N 7/173*      (2011.01)

(52) U.S. Cl.
    USPC .............. 726/27; 726/26; 725/122; 705/14.4; 705/14.45; 705/14.73

(58) Field of Classification Search
    USPC ............... 726/27, 26; 705/14.4, 14.45, 14.73; 725/122
See application file for complete search history.

(56) References Cited

U.S. PATENT DOCUMENTS

| | | | |
|---|---|---|---|
| 5,408,519 | A | 4/1995 | Pierce et al. |
| 5,459,306 | A | 10/1995 | Stein et al. |
| 5,600,364 | A | 2/1997 | Hendricks et al. |
| 5,613,213 | A | 3/1997 | Naddell et al. |
| 5,678,179 | A | 10/1997 | Turcotte et al. |
| 5,978,775 | A | 11/1999 | Chen |
| 5,978,833 | A | 11/1999 | Pashley et al. |
| 6,006,197 | A | 12/1999 | d'Eon et al. |
| 6,009,410 | A | 12/1999 | LeMole et al. |
| 6,023,700 | A | 2/2000 | Owens et al. |
| 6,055,512 | A | 4/2000 | Dean et al. |
| 6,055,513 | A | 4/2000 | Katz et al. |

(Continued)

FOREIGN PATENT DOCUMENTS

| | | |
|---|---|---|
| BE | 1015704 | 7/2005 |
| DE | 199 41 461 A1 | 3/2001 |

(Continued)

OTHER PUBLICATIONS

Office Action Issued Oct. 15, 2010 by the U.S. Patent Office in related U.S. Appl. No. 12/080,124 (28 pages).

(Continued)

*Primary Examiner* — Beemnet Dada
*Assistant Examiner* — Thomas Gyorfi
(74) *Attorney, Agent, or Firm* — Novak Druce Connolly Bove + Quigg LLP

(57) ABSTRACT

System and method for managing distribution of content such as television programs to portable multi-media devices which are capable of using such content and communicating includes a broadcast management system arranged to manage delivery of content from content sources to the devices, an account management system arranged to manage requests for use of the content from the devices and manage communications to and from the devices, and a processing system coupled to the account management system and arranged to analyze requests to use content relative to information about users of the devices in order to determine whether delivery of the content to the users can be offset against a preallocated amount of resource usage. If so, a message is delivered to that user's device and the device presents the message to the user as a condition for use of the content.

18 Claims, 3 Drawing Sheets

(56) References Cited

U.S. PATENT DOCUMENTS

| | | | |
|---|---|---|---|
| 6,097,942 A | 8/2000 | Laiho | |
| 6,253,189 B1 | 6/2001 | Feezell et al. | |
| 6,286,005 B1 | 9/2001 | Cannon | |
| 6,334,145 B1 | 12/2001 | Adams et al. | |
| 6,338,044 B1 | 1/2002 | Cook et al. | |
| 6,345,279 B1 | 2/2002 | Li et al. | |
| 6,381,465 B1 | 4/2002 | Chern et al. | |
| 6,393,407 B1 | 5/2002 | Middleton, III et al. | |
| 6,405,243 B1 | 6/2002 | Nielsen | |
| 6,408,309 B1 | 6/2002 | Agarwal | |
| 6,446,261 B1 | 9/2002 | Rosser | |
| 6,502,076 B1 | 12/2002 | Smith | |
| 6,684,249 B1 | 1/2004 | Frerichs et al. | |
| 6,690,394 B1 | 2/2004 | Harui | |
| 6,718,551 B1 | 4/2004 | Swix et al. | |
| 6,738,978 B1 | 5/2004 | Hendricks et al. | |
| 6,886,000 B1 | 4/2005 | Aggarwal et al. | |
| 6,920,326 B2 | 7/2005 | Agarwal et al. | |
| 6,990,462 B1 | 1/2006 | Wilcox et al. | |
| 7,039,599 B2 | 5/2006 | Merriman et al. | |
| 7,072,947 B1 | 7/2006 | Knox et al. | |
| 7,149,537 B1 | 12/2006 | Kupsh et al. | |
| 7,168,084 B1 | 1/2007 | Hendricks et al. | |
| 7,203,684 B2 | 4/2007 | Carobus et al. | |
| 7,280,818 B2 | 10/2007 | Clayton | |
| 7,356,477 B1 | 4/2008 | Allan et al. | |
| 7,370,002 B2 | 5/2008 | Heckerman et al. | |
| 7,437,549 B2* | 10/2008 | Lindqvist et al. | 713/153 |
| 7,539,652 B2 | 5/2009 | Flinn et al. | |
| 7,558,559 B2 | 7/2009 | Alston | |
| 7,669,212 B2 | 2/2010 | Alao et al. | |
| 7,685,019 B2 | 3/2010 | Collins | |
| 7,730,017 B2 | 6/2010 | Nance et al. | |
| 7,734,632 B2 | 6/2010 | Wang | |
| 7,747,676 B1 | 6/2010 | Nayfeh et al. | |
| 7,895,275 B1* | 2/2011 | Evans et al. | 709/206 |
| 7,912,843 B2 | 3/2011 | Murdock et al. | |
| 7,960,005 B2* | 6/2011 | Hunter et al. | 428/64.1 |
| 8,046,797 B2 | 10/2011 | Bentolila et al. | |
| 8,060,406 B2 | 11/2011 | Blegen | |
| 8,135,799 B2* | 3/2012 | Mekikian | 709/217 |
| 8,191,098 B2* | 5/2012 | Cooper et al. | 725/105 |
| 8,196,166 B2* | 6/2012 | Roberts et al. | 725/34 |
| 8,229,786 B2 | 7/2012 | Cetin et al. | |
| 2001/0044739 A1 | 11/2001 | Bensamana | |
| 2001/0047272 A1 | 11/2001 | Frietas et al. | |
| 2001/0051925 A1 | 12/2001 | Kang | |
| 2002/0004743 A1 | 1/2002 | Kutaragi et al. | |
| 2002/0006803 A1 | 1/2002 | Mendiola et al. | |
| 2002/0016736 A1 | 2/2002 | Cannon et al. | |
| 2002/0019829 A1 | 2/2002 | Shapiro | |
| 2002/0021809 A1* | 2/2002 | Salo et al. | 380/239 |
| 2002/0052781 A1 | 5/2002 | Aufricht et al. | |
| 2002/0075305 A1 | 6/2002 | Beaton et al. | |
| 2002/0077130 A1 | 6/2002 | Owensby | |
| 2002/0078147 A1 | 6/2002 | Bouthors et al. | |
| 2002/0083411 A1 | 6/2002 | Bouthers et al. | |
| 2002/0111177 A1 | 8/2002 | Castres | |
| 2002/0120498 A1 | 8/2002 | Gordon et al. | |
| 2002/0137507 A1 | 9/2002 | Winkler | |
| 2002/0138291 A1 | 9/2002 | Vaidyanathan et al. | |
| 2002/0161770 A1 | 10/2002 | Shapiro et al. | |
| 2002/0164977 A1 | 11/2002 | Link, II et al. | |
| 2002/0165773 A1 | 11/2002 | Natsumo et al. | |
| 2002/0175935 A1 | 11/2002 | Wang et al. | |
| 2003/0003935 A1 | 1/2003 | Vesikivi et al. | |
| 2003/0023489 A1 | 1/2003 | McGuire et al. | |
| 2003/0040297 A1 | 2/2003 | Pecen et al. | |
| 2003/0083931 A1 | 5/2003 | Lang | |
| 2003/0101454 A1 | 5/2003 | Ozer et al. | |
| 2003/0126015 A1 | 7/2003 | Chan et al. | |
| 2003/0126146 A1 | 7/2003 | Van Der Riet | |
| 2003/0130887 A1 | 7/2003 | Nathaniel | |
| 2003/0144022 A1 | 7/2003 | Hatch | |
| 2003/0154300 A1 | 8/2003 | Mostafa | |
| 2003/0182567 A1 | 9/2003 | Barton et al. | |
| 2003/0188017 A1 | 10/2003 | Nomura | |
| 2003/0191689 A1 | 10/2003 | Bosarge et al. | |
| 2003/0197719 A1 | 10/2003 | Lincke et al. | |
| 2004/0003398 A1 | 1/2004 | Donian et al. | |
| 2004/0043777 A1 | 3/2004 | Brouwer et al. | |
| 2004/0045029 A1 | 3/2004 | Matsuura | |
| 2004/0054576 A1 | 3/2004 | Kanerva et al. | |
| 2004/0068435 A1 | 4/2004 | Braunzell | |
| 2004/0133480 A1 | 7/2004 | Domes | |
| 2004/0136358 A1 | 7/2004 | Hind et al. | |
| 2004/0185883 A1 | 9/2004 | Rukman | |
| 2004/0192359 A1 | 9/2004 | McRaild et al. | |
| 2004/0203761 A1 | 10/2004 | Baba et al. | |
| 2004/0203851 A1 | 10/2004 | Vetro et al. | |
| 2004/0204133 A1 | 10/2004 | Andrew et al. | |
| 2004/0209649 A1 | 10/2004 | Lord | |
| 2004/0259526 A1 | 12/2004 | Goris et al. | |
| 2005/0010641 A1 | 1/2005 | Staack | |
| 2005/0021397 A1 | 1/2005 | Cui et al. | |
| 2005/0033700 A1 | 2/2005 | Vogler et al. | |
| 2005/0060425 A1 | 3/2005 | Yeh et al. | |
| 2005/0075929 A1 | 4/2005 | Wolinsky et al. | |
| 2005/0119936 A1 | 6/2005 | Buchanan et al. | |
| 2005/0125397 A1 | 6/2005 | Gross et al. | |
| 2005/0138140 A1 | 6/2005 | Wen et al. | |
| 2005/0228680 A1 | 10/2005 | Malik | |
| 2005/0228797 A1 | 10/2005 | Koningstein et al. | |
| 2005/0229209 A1 | 10/2005 | Hildebolt et al. | |
| 2005/0239495 A1 | 10/2005 | Bayne | |
| 2005/0239504 A1 | 10/2005 | Ishii et al. | |
| 2005/0249216 A1 | 11/2005 | Jones | |
| 2005/0267798 A1 | 12/2005 | Panara | |
| 2005/0273465 A1 | 12/2005 | Kimura | |
| 2005/0273833 A1 | 12/2005 | Soinio | |
| 2005/0289113 A1 | 12/2005 | Bookstaff | |
| 2006/0031164 A1 | 2/2006 | Kim | |
| 2006/0031327 A1 | 2/2006 | Kredo | |
| 2006/0037039 A1 | 2/2006 | Aaltonen | |
| 2006/0040642 A1 | 2/2006 | Boris et al. | |
| 2006/0048059 A1 | 3/2006 | Etkin | |
| 2006/0059133 A1 | 3/2006 | Moritani | |
| 2006/0068845 A1 | 3/2006 | Muller et al. | |
| 2006/0075425 A1 | 4/2006 | Koch et al. | |
| 2006/0095511 A1 | 5/2006 | Munarriz et al. | |
| 2006/0117378 A1 | 6/2006 | Tam et al. | |
| 2006/0123014 A1 | 6/2006 | Ng | |
| 2006/0129455 A1 | 6/2006 | Shah | |
| 2006/0141923 A1 | 6/2006 | Goss | |
| 2006/0161520 A1 | 7/2006 | Brewer et al. | |
| 2006/0167747 A1 | 7/2006 | Goodman et al. | |
| 2006/0168616 A1 | 7/2006 | Candelore | |
| 2006/0173784 A1* | 8/2006 | Marples et al. | 705/52 |
| 2006/0194595 A1 | 8/2006 | Myllynen et al. | |
| 2006/0200460 A1 | 9/2006 | Meyerzon et al. | |
| 2006/0200461 A1 | 9/2006 | Lucas et al. | |
| 2006/0206586 A1 | 9/2006 | Ling et al. | |
| 2006/0276170 A1 | 12/2006 | Radhakrishnan et al. | |
| 2006/0276213 A1 | 12/2006 | Gottschalk et al. | |
| 2006/0277316 A1* | 12/2006 | Wang et al. | 709/231 |
| 2006/0282319 A1* | 12/2006 | Maggio | 705/14 |
| 2006/0282328 A1 | 12/2006 | Gerace et al. | |
| 2006/0286963 A1 | 12/2006 | Koskinen et al. | |
| 2006/0286964 A1 | 12/2006 | Polanski et al. | |
| 2006/0288124 A1 | 12/2006 | Kraft et al. | |
| 2007/0004333 A1 | 1/2007 | Kavanti | |
| 2007/0016743 A1 | 1/2007 | Jevans | |
| 2007/0022021 A1 | 1/2007 | Walker et al. | |
| 2007/0027703 A1 | 2/2007 | Hu et al. | |
| 2007/0027760 A1 | 2/2007 | Collins et al. | |
| 2007/0027762 A1 | 2/2007 | Collins et al. | |
| 2007/0037562 A1 | 2/2007 | Smith-Kerker et al. | |
| 2007/0047523 A1 | 3/2007 | Jiang | |
| 2007/0061195 A1 | 3/2007 | Liu et al. | |
| 2007/0061300 A1 | 3/2007 | Ramer et al. | |
| 2007/0067215 A1* | 3/2007 | Agarwal et al. | 705/14 |
| 2007/0072631 A1 | 3/2007 | Mock et al. | |
| 2007/0074262 A1 | 3/2007 | Kikkoji et al. | |
| 2007/0078712 A1* | 4/2007 | Ott et al. | 705/14 |

(56) References Cited

U.S. PATENT DOCUMENTS

| | | | |
|---|---|---|---|
| 2007/0083602 A1 | 4/2007 | Heggenhougen et al. | |
| 2007/0088687 A1 | 4/2007 | Bromm et al. | |
| 2007/0088801 A1 | 4/2007 | Levkovitz et al. | |
| 2007/0088851 A1 | 4/2007 | Levkovitz et al. | |
| 2007/0094066 A1 | 4/2007 | Kumar et al. | |
| 2007/0100651 A1 | 5/2007 | Ramer et al. | |
| 2007/0100805 A1 | 5/2007 | Ramer et al. | |
| 2007/0105536 A1 | 5/2007 | Tingo, Jr. | |
| 2007/0113243 A1 | 5/2007 | Brey | |
| 2007/0117571 A1 | 5/2007 | Musial | |
| 2007/0118592 A1 | 5/2007 | Bachenberg | |
| 2007/0136457 A1 | 6/2007 | Dai et al. | |
| 2007/0149208 A1 | 6/2007 | Syrbe et al. | |
| 2007/0156534 A1* | 7/2007 | Lerner et al. | 705/14 |
| 2007/0162335 A1* | 7/2007 | Mekikian | 705/14 |
| 2007/0180147 A1 | 8/2007 | Leigh | |
| 2007/0192409 A1 | 8/2007 | Kleinstern et al. | |
| 2007/0198485 A1 | 8/2007 | Ramer et al. | |
| 2007/0208619 A1* | 9/2007 | Branam et al. | 705/14 |
| 2007/0233671 A1 | 10/2007 | Oztekin et al. | |
| 2007/0244750 A1* | 10/2007 | Grannan et al. | 705/14 |
| 2007/0260624 A1 | 11/2007 | Chung et al. | |
| 2007/0288950 A1 | 12/2007 | Downey et al. | |
| 2007/0290787 A1 | 12/2007 | Fiatal et al. | |
| 2008/0004046 A1 | 1/2008 | Mumick et al. | |
| 2008/0004958 A1* | 1/2008 | Ralph et al. | 705/14 |
| 2008/0013537 A1 | 1/2008 | Dewey et al. | |
| 2008/0032703 A1 | 2/2008 | Krumm et al. | |
| 2008/0032717 A1 | 2/2008 | Sawada et al. | |
| 2008/0040175 A1* | 2/2008 | Dellovo | 705/7 |
| 2008/0052158 A1 | 2/2008 | Ferro et al. | |
| 2008/0065491 A1 | 3/2008 | Bakman | |
| 2008/0070579 A1 | 3/2008 | Kankar et al. | |
| 2008/0071875 A1 | 3/2008 | Koff et al. | |
| 2008/0071929 A1 | 3/2008 | Motte et al. | |
| 2008/0082686 A1 | 4/2008 | Schmidt et al. | |
| 2008/0091796 A1 | 4/2008 | Story | |
| 2008/0133344 A1 | 6/2008 | Hyder et al. | |
| 2008/0140508 A1 | 6/2008 | Anand et al. | |
| 2008/0160911 A1* | 7/2008 | Chou et al. | 455/7 |
| 2008/0228568 A1 | 9/2008 | Williams et al. | |
| 2008/0243619 A1 | 10/2008 | Sharman et al. | |
| 2008/0249832 A1 | 10/2008 | Richardson et al. | |
| 2008/0271068 A1 | 10/2008 | Ou et al. | |
| 2008/0281606 A1 | 11/2008 | Kitts et al. | |
| 2008/0288476 A1 | 11/2008 | Kim et al. | |
| 2008/0319836 A1 | 12/2008 | Aaltonen et al. | |
| 2009/0006194 A1 | 1/2009 | Sridharan et al. | |
| 2009/0029721 A1 | 1/2009 | Doraswamy | |
| 2009/0049090 A1 | 2/2009 | Shenfield et al. | |
| 2009/0063249 A1 | 3/2009 | Tomlin et al. | |
| 2009/0106111 A1 | 4/2009 | Walk et al. | |
| 2009/0125377 A1 | 5/2009 | Somji et al. | |
| 2009/0132395 A1 | 5/2009 | Lam et al. | |
| 2009/0138304 A1 | 5/2009 | Aharoni et al. | |
| 2009/0197619 A1 | 8/2009 | Colligan et al. | |
| 2009/0216847 A1 | 8/2009 | Krishnaswamy et al. | |
| 2009/0240677 A1 | 9/2009 | Parekh et al. | |
| 2009/0275315 A1 | 11/2009 | Alston | |
| 2009/0286520 A1 | 11/2009 | Nielsen et al. | |
| 2009/0298483 A1 | 12/2009 | Bratu et al. | |
| 2010/0030647 A1 | 2/2010 | Shahshahani | |
| 2010/0082397 A1 | 4/2010 | Blegen et al. | |
| 2010/0082423 A1 | 4/2010 | Nag et al. | |
| 2010/0088152 A1 | 4/2010 | Bennett | |
| 2010/0114654 A1 | 5/2010 | Lukose et al. | |
| 2010/0125505 A1 | 5/2010 | Puttaswamy | |
| 2010/0138271 A1 | 6/2010 | Henkin | |
| 2010/0153216 A1 | 6/2010 | Liang et al. | |
| 2010/0161424 A1 | 6/2010 | Sylvain | |
| 2010/0169157 A1 | 7/2010 | Muhonen et al. | |
| 2010/0169176 A1 | 7/2010 | Turakhia | |
| 2011/0106840 A1 | 5/2011 | Barrett et al. | |
| 2011/0209067 A1 | 8/2011 | Bogess et al. | |
| 2011/0276401 A1 | 11/2011 | Knowles et al. | |

FOREIGN PATENT DOCUMENTS

| | | |
|---|---|---|
| DE | 19941461 | 3/2001 |
| DE | 10061984 | 6/2002 |
| EP | 0 831 629 A2 | 3/1998 |
| EP | 1 043 905 | 10/2000 |
| EP | 1061465 | 12/2000 |
| EP | 1073293 | 1/2001 |
| EP | 1 107 137 A2 | 6/2001 |
| EP | 1 109 371 A2 | 6/2001 |
| EP | 1 195 701 A1 | 4/2002 |
| EP | 1220132 | 7/2002 |
| EP | 1239392 | 9/2002 |
| EP | 1280087 | 1/2003 |
| EP | 1365604 | 11/2003 |
| EP | 1408705 | 4/2004 |
| EP | 1455511 | 9/2004 |
| EP | 1 509 024 A2 | 2/2005 |
| EP | 1528827 | 5/2005 |
| EP | 1542482 | 6/2005 |
| EP | 1587332 | 10/2005 |
| EP | 1615455 | 1/2006 |
| EP | 1 633 100 A1 | 3/2006 |
| EP | 1633100 | 3/2006 |
| EP | 1677475 | 7/2006 |
| EP | 1772822 | 4/2007 |
| GB | 2 343 051 A | 4/2000 |
| GB | 2369218 | 5/2002 |
| GB | 2372867 | 9/2002 |
| GB | 2 386 509 A | 9/2003 |
| GB | 2406996 | 4/2005 |
| GB | 2 414 621 A | 11/2005 |
| GB | 2414621 | 11/2005 |
| GB | 2 416 887 A | 2/2006 |
| GB | 2 424 546 A | 9/2006 |
| JP | 2002-140272 | 5/2002 |
| JP | 2002140272 | 5/2002 |
| JP | 2007087138 | 4/2007 |
| JP | 2007199821 | 8/2007 |
| KR | 2003-0049440 | 6/2003 |
| KR | 200644760 A | 2/2006 |
| KR | 2007-011675 | 11/2007 |
| WO | WO 89/10610 | 11/1989 |
| WO | 96/24213 | 8/1996 |
| WO | 98/21713 | 5/1998 |
| WO | 00/00916 | 1/2000 |
| WO | 00/30002 | 5/2000 |
| WO | 00/44151 | 7/2000 |
| WO | WO 00/70848 | 11/2000 |
| WO | 01/22748 | 3/2001 |
| WO | WO 01/22748 A1 | 3/2001 |
| WO | 01/31497 | 5/2001 |
| WO | WO 01/31497 A1 | 5/2001 |
| WO | 01/44977 | 6/2001 |
| WO | 01/52161 | 7/2001 |
| WO | 01/57705 | 8/2001 |
| WO | 01/58178 | 8/2001 |
| WO | 01/63423 | 8/2001 |
| WO | WO 01/57705 A1 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | WO 01/65411 A1 | 9/2001 |
| WO | WO 01/71949 A1 | 9/2001 |
| WO | 01/91400 | 11/2001 |
| WO | 01/93551 | 12/2001 |
| WO | 01/97539 | 12/2001 |
| WO | WO 02/09431 A2 | 1/2002 |
| WO | 02/31624 | 4/2002 |
| WO | WO 02/35324 A2 | 5/2002 |
| WO | 02/44989 | 6/2002 |
| WO | WO 02/50632 A2 | 6/2002 |
| WO | 02/054803 | 7/2002 |
| WO | 02/069585 | 9/2002 |
| WO | 02/069651 | 9/2002 |
| WO | 02/075574 | 9/2002 |
| WO | WO 02/069585 A2 | 9/2002 |
| WO | 02/084895 | 10/2002 |

(56) References Cited

FOREIGN PATENT DOCUMENTS

| | | |
|---|---|---|
| WO | WO 02/086664 A2 | 10/2002 |
| WO | 02/096056 | 11/2002 |
| WO | WO 02/100121 | 12/2002 |
| WO | 03/015430 | 2/2003 |
| WO | WO 03/015430 A1 | 2/2003 |
| WO | 03/019845 | 3/2003 |
| WO | 03/024136 | 3/2003 |
| WO | WO 03/019913 A1 | 3/2003 |
| WO | WO 03/024136 A1 | 3/2003 |
| WO | 03/049461 | 6/2003 |
| WO | 03/088690 | 10/2003 |
| WO | WO 2004/057578 | 7/2004 |
| WO | 2004/084532 | 9/2004 |
| WO | 2004/086791 | 10/2004 |
| WO | WO 2004/093044 A1 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2005/029769 | 3/2005 |
| WO | WO 2005/020578 A1 | 3/2005 |
| WO | WO 2005/029769 A1 | 3/2005 |
| WO | 2005/073863 | 8/2005 |
| WO | 2005/076650 | 8/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/027407 | 3/2006 |
| WO | 2006/040749 | 4/2006 |
| WO | 2006/093284 | 9/2006 |
| WO | 2006/119481 | 11/2006 |
| WO | WO 2006/119481 A2 | 11/2006 |
| WO | 2007/002025 | 1/2007 |
| WO | WO 2007/001118 A1 | 1/2007 |
| WO | 2007/060451 | 5/2007 |
| WO | 2007/091089 | 8/2007 |
| WO | 2007/103263 | 9/2007 |
| WO | 2008/013437 | 1/2008 |
| WO | WO 2008/024852 A2 | 2/2008 |
| WO | 2008/045867 | 4/2008 |
| WO | 2008/147919 | 12/2008 |
| WO | 2009/009507 | 1/2009 |
| WO | 2009032856 | 3/2009 |
| WO | 2009/061914 | 5/2009 |
| WO | 2009/077888 | 6/2009 |
| WO | 2009/099876 | 8/2009 |
| WO | 2009/158097 | 12/2009 |

OTHER PUBLICATIONS

International Preliminary Report on Patentability issued Nov. 24, 2009 in International Application PCT/EP2008/056342 (1 page).
Written Opinion of the International Searching Authority issued Nov. 24, 2009 in International Application PCT/EP2008/056342 (6 pages).
Office Action dated Mar. 31, 2011 issue by the U.S. Patent Office in related U.S. Appl. No. 12/080,124 (29 pages).
Communication (International Search Report along with Written Opinion of International Searching Authority) mailed Oct. 8, 2008 issued by the International Searching Authority in counterpart International Application PCT/EP2008/056342.
Communication (European Search Report) dated Oct. 17, 2008 issued by the European Patent Office in counterpart European Patent Application EP 08 15 6763.
Communication (Search Report under Section 17 along with Examination Report under Section 18(3)) dated Oct. 6, 2008 issued by the United Kingdom Intellectual Property Office in counterpart U.K. Application GB 08094321.3.
"Advertisement System, Method and Computer Program Product", IP.com Prior Art Database Disclosure, Pub No. IPCOM000138557D, dated Jul. 24, 2006, IP.com, Amherst, NY (Available online at http://priordatabase.com/IPCOM/000138557, last visited Aug. 30, 2010).
"Combined Search and Examination Report", for United Kingdom Patent Application No. GB 0816228.1 dated, Jan. 6, 2009.
"Combined Search and Examination Report dated Mar. 7, 2008", for United Kingdom Patent Application No. GB 0721863.9.
"Communication (Combined Search and Examination Report under Sections 17 and 18(3)) dated Jan. 30, 2009 issued from the United Kingdom Patent Office", in related United Kingdom Application No. GB 0818145.5 (8 pages).
"Communication (European Search Report) dated Jun. 26, 2008", in European Patent Application No. EP 08101394.
"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009 (6 pages).
"Communication Pursuant to Article 94(3) EPC (European Examination Report) dated Oct. 23, 2008", issued in counterpart European Patent Application No. EP 08101394.8-1238.
"Examination Report", for counterpart European Patent Application No. 08153257.4 issued Jun. 2, 2009.
"Examination Report dated Nov. 9, 2009", for European Patent Application No. EP 08159355.0, Sep. 11, 2009.
"Examination Report dated Jun. 17, 2009", issued in counterpart U.K. Application No. GB 0803273.2 by U.K. Intellectual Property Office (4 pages).
"International Search Report", for International Application No. PCT/FI2006/050455, dated Jul. 25, 2007.
"International Search Report and Written Opinion mailed on Aug. 26, 2011", for PCT/US 2011/034927 titled "Content Delivery Based on User Terminal Events,".
"International Search Report and Written Opinion of the International Search Authority mailed Jun. 19, 2009", for International Application No. PCT/EP 2008/056069.
"International Search Report and Written Opinion of the International Searching Authority mailed Feb. 11, 2009, issued by the International Searching Authority", in related International Application PCT/EP 2008/063839 (11 pages).
"Notice of Allowance dated Apr. 29, 2011", U.S. Appl. No. 11/888,680, 13 pages.
"Office Action issued from the USPTO dated Aug. 20, 2009", issued in related U.S. Appl. No. 12/075,593 (14 pages).
"Office Action issued Mar. 17, 2010", in related U.S. Appl. No. 12/075,593 (11 pages).
"Search Report under Section 17 dated Jul. 7, 2008", in related U.K. Application GB 0803273.2.
"U.K. Search Report under Section 17 dated Oct. 23, 2007", in U.K. Application No. 0712280.7.
"Written Opinion of the International Searching Authority mailed Mar. 24, 2009 issued from the International Searching Authority", in related PCT International Application No. PCT/EP 2008/063326 (5 pages).
"XP002456252—Statement in Accordance with the Notice from the European Patent Office dated Oct. 1, 2007", concerning business methods (OJ p. 592-593), Nov. 1, 2007.
Hillard, Dustin et al., "Improving Ad Relevance in Sponsored Search", Proceedings of the third ACM International conference on Web search and data mining, WSDM'10, Feb. 4-6, 2010, Session: Ads, pp. 361-369, ACM, New York, New York, USA.
Internet Reference, , "Specific Media Behavioral Targeting Index", Specific Media, Inc., Irvine, CA, 2010, Available online at http://www.specificmedia.com/behavioral-targeting.php.
Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, May 11, 1999, 1259-1272.
Mueller, Milton , "Telecommunication Access in Age of Electronic Commerce: Toward a Third-Generation Service Policy", Nov. 1996, HeinOnline, 49. Fed. Comm L.J., Nov. 1, 1996, 655-665.
Perkins, Ed , "When to but airfare", http://www.smartertrael.com/travel-advice/when-to-buy-airfare.html?id=1628038, Nov. 21, 2006 (4 pages).

(56) References Cited

OTHER PUBLICATIONS

Regelson, Moira et al., "Predicting Click-Through Rate Using Keyword Clusters", Proceedings of the Second Workshop on Sponsored Search Auctions, EC'06, SSA2, Jun. 11, 2006, ACM.

Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, May 8, 2007, 521-529.

Shaikh, Baber M. et al., "Cutomized User Segments for Ad Targeting", IP.com Prior Art Database Disclosure, Pub No. IPCOM000185640D, dated Jul. 29, 2009 UTC, IP.com, Amherst, NY (Available online at http://priordatabase.com/IPCOM/000185640, last visited Aug. 30, 2010).

"AdWords Reference Guide", Google, 2004.

Ghose, Anindya et al., "An Empirical Analysis of Search Engine Advertising: Sponsored Search in Electronic Markets", Management Science, Informs, 2009.

Karuga, Gilber G. et al., "AdPalette: An Algorithm for Customizing Online Advertisements on the Fly", Decision Support Systems, vol. 32, 2001.

Science Dictionary, , Definition of "dynamic", 2002.

World English Dictionary, , Definition of "relevant", 1998.

\* cited by examiner

MESSAGE DELIVERY MANAGEMENT METHOD AND SYSTEM

CROSS-REFERENCE TO RELATED APPLICATION

This application claims the benefit of the filing date of U.S. Provisional Patent Application Ser. No. 60/931,398 filed May 22, 2007. The entire disclosures of U.S. Provisional Patent Application Ser. No. 60/931,398 and U.S. Non-Provisional application Ser. No. 12/080,124 filed Apr. 1, 2008 are incorporated by reference herein.

FIELD OF THE INVENTION

The present invention relates to a method and system for delivering messages to mobile multi-media devices of subscribers.

BACKGROUND INFORMATION

The popularity of mobile multi-media devices including telephones has enabled their use, along with related infrastructure, as a media for providing mobile marketing and advertising, i.e., delivering messages, to the users of the devices. This is important because such a concept is considered by content providers as the next new channel to directly reach recipients since it utilizes core assets and characteristics of the mobile media, namely, it is personal in that it is directed solely to individual recipients, it is "always on" and can reach the recipients whenever they access their communications devices, it is mobile and naturally forms groups of people who communicate actively with each other. These characteristics combined with social networks-based approaches of the Internet could form a very powerful base to execute marketing strategies.

The introduction of mobile telephones with sufficient connectivity enabled by, for example, broadband $3^{rd}$ generation, wireless local area network (WLAN) and/or broadcast connectivity, such as Digital Video Broadcasting for Handheld (DVB-H), and with color screens and processing power has enabled the realization of providing television services to the mobile telephones and other mobile devices, which are now more accurately referred to as mobile multi-media devices. Providing such television services to mobile multi-media devices is generally known as mobile television.

There are basically only a few models of mobile television currently available (which are the same as those for broadcast television). One is free television which is typically paid for by content providers whose messages are interspersed with the programming. Another is a pay television model wherein a subscriber pays for watching a television program or subscribes to a service or channel for a set time period. Combinations of free television and pay television are also available.

Regardless of which model of mobile television is used, the investment for building a mobile television network is relatively high. Therefore, mobile television is currently mostly available by paid subscription, i.e., a user must pay to obtain mobile television service, although there are message and government subsidized channels. Another cost consideration for offering mobile television service is that in some areas, local legislation might require the mobile television operator to offer some or all of the same networks as in normal terrestrial, cable or satellite television.

In a typical broadcast television model in which programming is paid for by content providers whose messages are interspersed with the programming, a message model is generated to determine the cost for the messages. The message model relies on predictions on the target audience of the television channel on which the program is being broadcast as well as on the target audience for the specific program that is being broadcast. Several companies, such as Nielsen Research, provide a target audience prediction service and an actual audience computation service to check the accuracy of the prediction in order to improve future predictions.

Content providers often have concerns with the results of the target audience computations because there is a possibility that viewers might change channels to change the program being viewed and/or might not be watching the television while the messages are being broadcast.

These concerns, and others, results in a relatively low "cost per eye ball" or CPM (cost per million) for messages delivered via broadcast television. On the other hand, television programs which are statistically popular have large audiences and provide good advertising and marketing opportunities for content providers.

SUMMARY OF THE INVENTION

The present invention utilizes resource management capabilities of a communications network to increase the value ascribed to a mobile television viewer by a content provider in comparison to the value of a content viewer of traditional broadcasting in which messages are sent to all viewers.

In one embodiment of the invention, access to content for viewing and/or listening on multi-media devices is managed by coupling the devices to a broadcast system which processes requests from users for delivery of content to their devices and provides the content to the devices via a broadcast network, and also coupling the devices to a mobile message system which manages the allocation of resource usage associated with the delivery of messages to the devices. The broadcast system and the mobile message system are integrated with one another to require exposure to messages as a condition for using the content. In this manner, the resource usage required for delivering content to the devices can be offset by a preallocated amount of resource usage that is managed by content providers in exchange for the delivery of messages to the devices. Examples of factors determining the resource usage include connection times, types of communications sessions (e.g. broadcast, multicast), and can vary as a function of type of network(s) required for the delivery of the content.

The content may be television programs in which case, the broadcast system is a mobile television system, and the messages are of a form which is displayed to the viewers before, during or after watching the television programs.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
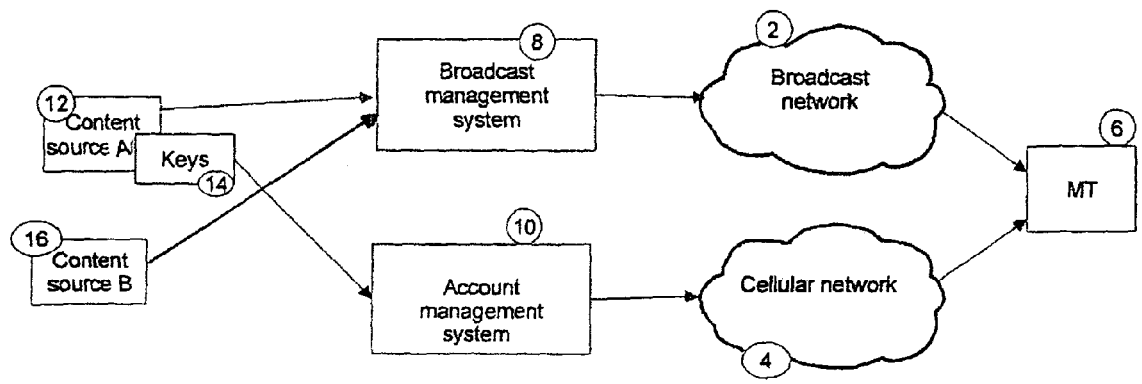
FIG. 1 is a schematic of a mobile television broadcast system in accordance with the invention.

Referring to the accompanying drawings wherein the same reference numerals refer to the same or similar elements, FIG. 1 shows an exemplary arrangement of a mobile broadcast system in accordance with an embodiment of the invention. The mobile broadcast system can have a single content source or multiple, different content sources, of which two different content sources (A & B) 12 and 16 are shown. The content from content source 12 (and any other content sources) may be protected by a set of digital rights management (DRM) keys 14. From content source 12, the content is fed to a broadcast network 2 via a broadcast management system 8 which typically generates an electronic service guide (ESG) for the services which are broadcast via the system. The broadcast management system 8 may also perform any necessary processing to enable delivery of the content from content source 12 to the desired broadcast destination, for example, transcoding and possibly Internet Protocol addressing needed to forward the content to the desired broadcast destination.

The broadcast network 2, when used to broadcast television programs, can be, for example, a DVB-H network. The broadcast network 2 comprises various broadcast components or elements such as Multiprotocol Encapsulations (MPE) and DVB-H transmitters (tx). Typically, there are several (10-50) television programs or streams which can be broadcast at the same time in each frequency allocated for the DVB-H.

The user's mobile multi-media devices, referred to as a mobile terminal 6, comprises a receiver (not shown) for broadcast television, such as a DVB-H receiver, and related software and hardware (not shown) for showing or displaying the received program on a screen (not shown) of the mobile terminal 6. The mobile terminal 6 can be a monolithic terminal where all components are integrated in a single terminal or the mobile terminal can comprise separate parts which are connected together using wires or wirelessly (such as a separate DVB-H receiver and display screen).

Mobile terminal 6 may also include a cellular connectivity system (not shown) to enable various types of communications via a communications network 4 (for example, a cellular network). The cellular connectivity system may include a Global System for Mobile communications (GSM) transceiver, a $3^{rd}$ Generation transceiver, a wireless local area network transceiver and related hardware and software, and combinations of these components. The cellular network 4 may be a corresponding GSM network, 3G network, WLAN, or a combination thereof.

The content from content source 12, designated content A, may be provided free of charge to the mobile terminal 6 or be paid content, i.e., require payment in order to be provided to the mobile terminal 6. When content A is paid content, an account management system 10, which is operatively coupled thereto, is arranged to deliver keys 14 generated by the provider of content A or alternatively, creates associated keys itself. Cellular network 4 is used to deliver the keys to the mobile terminal 6, which are required in order to use the content A from content source 12. Account management system 10 also manages communications to and from mobile terminal 6 via the cellular network 4. Instead of delivering the DRM keys 14 to the mobile terminal 6 via the cellular network 4, it is possible to deliver the keys 14 using Bluetooth or WLAN or, for example, as a scratch card.

In one embodiment, the cellular network 4 is used as a back channel from the mobile terminal 6 to the account management system 10 to pay for the subscription to the broadcast television service. For free content, such as content B from content source 16, there is no need for account management system 10 since no keys 14 need to be delivered to the mobile terminal 6 to enable display (viewing) of the content. Nevertheless, account management system 10 could be needed if the content from content source 16 requires "free" keys, which "free" keys could be provided to the mobile terminal 6 via the cellular network 4.

Figure 2:
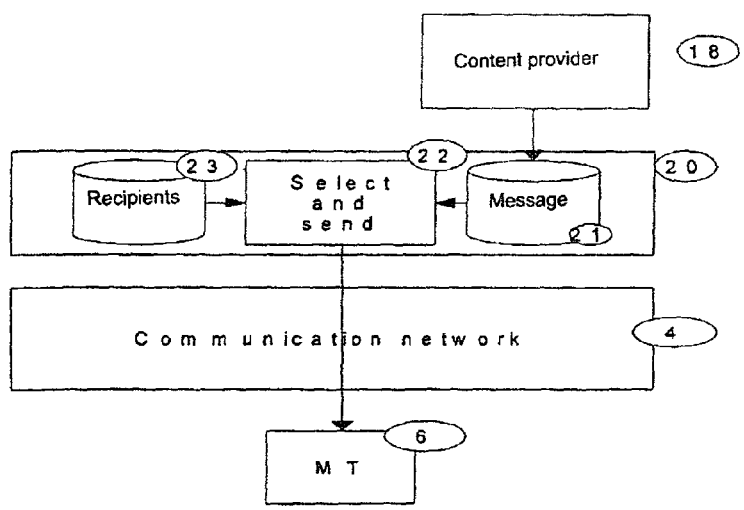
FIG. 2 is a schematic of a mobile message system in accordance with the invention.

Referring now to FIG. 2, a technique suitable for mobile multi-media devices or mobile terminals in accordance with the invention allows any number of content providers 18 to reserve, program and/or book message delivery campaigns via a web interface from a content management system 20. In a typical scenario, a content provider 18 provides messages to the content management system 20 in the form of data, text, pictures, audio, video, html, xml, xhtml, or any other form capable of being delivered and processed by the mobile terminal 6. Using the interface, each content provider 18 would also be able to select when to send content, the target group to which the content are to be delivered, the format for delivery of the content, a target price level of the content, a target feedback level of the content, demographics of the target audience, the duration of the message delivery campaign, and any other parameters relating to the message delivery campaign.

Content providers 12 can thus refer to a brand owner, a service provider, a message agent, a merchant or any other party that wants to provide messages or information to recipients. Content can be commercial, such as a product or service promotion, or non-commercial, such as a general information service notification.

Content management system 20 includes a database (content provider) 21 in which the content provided by the content providers 18 and related parameters of the message delivery campaign selected by the content providers 18 can be stored.

Content management system 20 can thus include a computer program which creates an interface to enable content providers 18 to design their message delivery campaign, including the messages to be used and the delivery parameters thereof. The computer program can manage database 21 and allow the content providers to update and otherwise manage their campaigns.

Content management system 20 also includes a user (recipient) database 23 which contains profile information of the users having mobile terminals 6 which subscribe to the network. The profile information can be any information relating to the users including demographics, sex, purchase history, phone number, preferences, likes and dislikes, etc. User database 23 may be integrated with content provider database 21 and they are not required to be separate elements as depicted in FIG. 2.

A processing element or software block (select and send) 22 is coupled to the user database 23 and to the content provider database 21 and combines content providers' preferences and the rules of the content providers' message delivery campaigns as stored in the content provider database 21, and the data in the user database 23 to deliver messages to mobile terminals 6 via the communications network 4.

For example, a content provider might want to send to all female users a message "Product A is good" on a Monday afternoon. In this process, the message, i.e., the text "Product A is good", delivery time and preferred target are programmed via a web interface by the content provider or its representative into the content management system 20. The processing element 22 thus receives these parameters and the message from the content provider database 21 and identifies female users from the data in user database 23 and delivers the messages to them accordingly.

Figure 3:
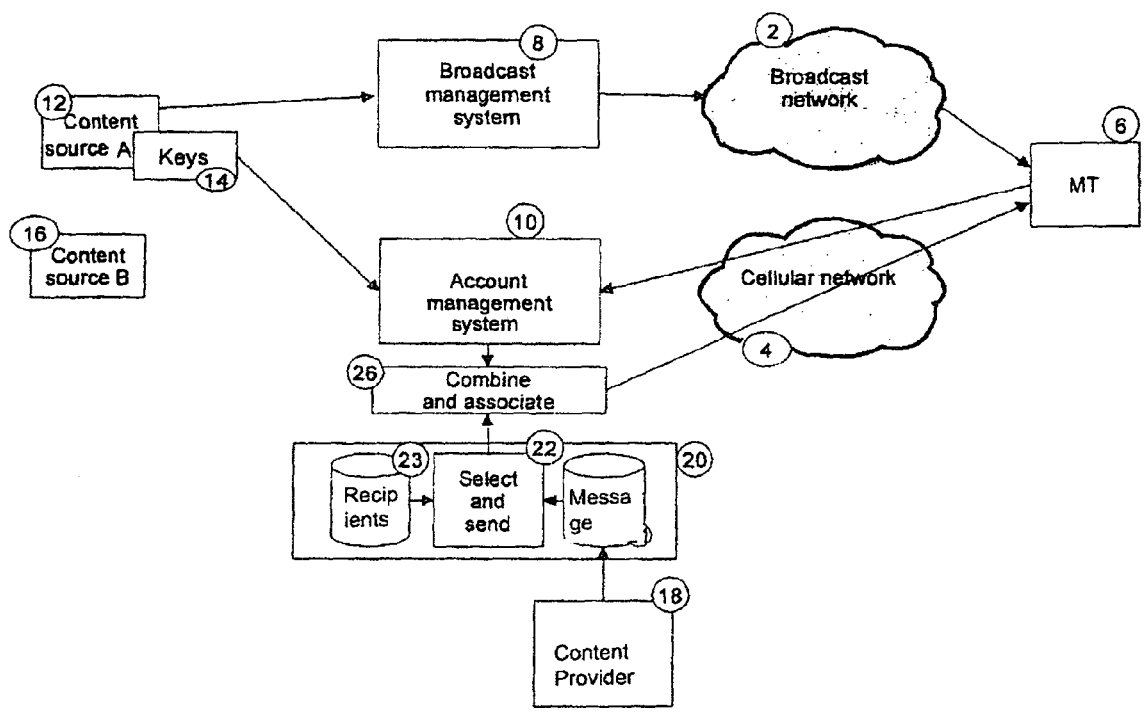
FIG. 3 is a schematic of a combined mobile television broadcast and message system in accordance with the invention.

Referring now to FIG. 3, in one embodiment of the invention, the mobile television broadcast system shown in FIG. 1 is combined with the message management technique shown in FIG. 2 to provide a mobile television service network which can offer subsidized or free mobile television service as a result of receiving payment from content providers to intersperse messages with the programs being delivered to users' mobile terminals. More specifically, in one embodiment, the content providers reserve an allocation of usage of network resources that are required to deliver the content, and the actual resource usage required to deliver particular content can be offset against the preallocated amount of resourced usage in exchange for delivery of specified messages to the user of the content. In this manner, the invention provides message driven mobile television.

As shown in FIG. 3, this is implemented by a processing system, processing unit or server, or software block "Combine and associate" 26 which operatively couples the content management system 20 (described above with reference to FIG. 2) to the account management system 10 (described above with reference to FIG. 1). The processing unit 26 is also operatively coupled to the cellular network 10 and receives requests for viewing, and also possibly delivery, of television programs from the mobile terminal 6. The user of mobile terminal 6 may only need to request viewing of a television program if they have already received it, either via broadcast network 2, or other means.

The mobile television service in accordance with the invention can be implemented in several ways, some of which are described below. For paid content A to be delivered from content source 12 to the user's mobile terminal 6, or for previously obtained paid content A to be viewed on the user's mobile terminal 6, the user's mobile terminal 6 may be programmed to recognize that a key 14 is needed to access content A and then request a key 14 from the account management system 10. A request for a key 14 would be considered by account management system 10 to be a request to view a television program. The account management system 10 communicates with the processing unit 26, or possibly even directly with the content management system 20, to find out if the user and the content A could be sponsored by one or more content providers 18; that is to say, whether there is an allocation of resource usage that can be allocated to, and offset against, the delivery of the content A to the user. The content provider or content providers would sponsor delivery and viewing (display) of content A if it has not already been provided to the user's mobile terminal 6, or only viewing (display) of content A if it has already been delivered or provided to the user's mobile terminal 6. Sponsorship of content A is thus either sponsorship for delivery and viewing (display) of content A or sponsorship for only viewing (display) of content A.

A computer program in the account management system 10 and/or content management system 20 could perform this analysis in order to determine whether content A is available for sponsorship and whether sponsorship of content A satisfies the parameters or rules provided by any of the content providers 18. In the latter case, this may entail analyzing the data relating to the user of mobile terminal 6 and comparing the user's profile data to data provided by content providers 18 for a target audience of a message delivery campaign.

If the computer program determines that there is an allocation of resource usage that can be offset against the delivery of the content to the user, the processing unit 26 forms a message packet with embedded DRM keys in the message, or otherwise associates the DRM key or keys with the message. One possible embodiment is to send a message with an interactive link. As the user clicks or selects the link, the DRM key is delivered to the user.

Alternatively, there can be messages which are sent as a flash Short Message Service (SMS) at the same time (or before or after) the DRM keys are delivered.

The message packet is delivered from the processing unit 26 to the user's mobile terminal 6 via the cellular network 4, or may also possibly be delivered via the broadcast network 2. The user's mobile terminal 6 receives the message packaged with the DRM keys and is able to then open the content stream received from content source 12 via the broadcast network 2, i.e., a television program, after being exposed to the message or in consideration for being subsequently exposed to the message during or after viewing of a television program.

With this arrangement, the owner of content A agrees to its viewing (display) by the user of mobile terminal 6 and/or its delivery to the user's mobile terminal 6 in exchange for allowing one or more messages to be delivered to the user to enable use of the content A. Content A has thus become message-paid content. Alternatively, the owner of content A may receive payment from content providers who associate their messages with the DRM keys 14, these payments essentially being made on behalf of the user of the mobile terminal 6 receiving content A. As a further alternative, a third party such as the afore-mentioned-content providers who associate their messages with the DRM keys 14 can reserve the preallocated network resources required to deliver the content, this being used to offset delivery of content A to a user.

In one embodiment, messages are not required to be associated with DRM keys 14, but rather, a message having prespecified content is delivered to the user's mobile terminal 6 with the content A. For example, when a user is determined to satisfy the criteria for a content provider's campaign, content A is delivered to the user's mobile terminal with a direct marketing message such as "Content A is sponsored by Product X". The processing unit 26 would thus deliver DRM keys 14 without packaging them with one or more messages.

In another embodiment, the users' feedback or response to messages sent before, during and/or after the mobile television broadcast is analyzed and that information is used to determine if the recipient will subsequently be provided with free or subsidized television programs. In this case, a user who provides certain responses could be rewarded with free or subsidized television service and would not necessarily be required to receive messages in order to enable access to the television programs.

Several computer programs resident on computer-readable media may be used in the invention. One computer program manages access to television programs for viewing on multimedia devices capable of viewing television programs obtained, for example, via a broadcast network and communicating, for example, via a cellular network. This computer program may be resident on a server which integrates a mobile television system such as shown in FIG. 1 and a mobile message system such as shown in FIG. 2. The computer program may thus obtain data relating to the users of the devices (usually performed by the mobile message system), receive requests from users for delivery of television programs to their devices (usually performed by the mobile television system), and analyze the data relating to the users and the requested television programs to determine whether delivery of the television program to each user can be sponsored. This latter step may be performed by a processing system or an integration unit (e.g., the processing unit 26 as shown in FIG. 3) which interacts with the mobile television system and the mobile message system. The processing unit 26 effects delivery of at least one message (from the mobile message system) to that user's device if the delivery of the television program to a user can be sponsored.

The devices should be programmed or otherwise arranged to present the message to the user in conjunction with viewing of the program. For example, when a DRM key is required to view the program, the computer program processes requests from users for delivery of DRM keys and arranges for delivery of DRM keys upon request. In one embodiment, the computer program packages messages and DRM keys in a packet and delivers the packet to the devices. The computer program may be the same as or different than the computer program which manages communications to and from the devices, e.g., via a cellular network.

As part of the integration with the mobile message system, the computer program may be arranged to generate an interface which enables content providers to set rules for delivery of messages to the users. The computer program would then analyze the data relating to the users and the requested television programs to determine whether delivery of the television program to each user can be sponsored, i.e., determine if each user satisfies rules set by any of the content providers. If not, the computer program could be designed not to provide any messages to the users devices with the television programs. On the other hand, the computer program would cause one or more messages to be delivered to the users' devices to be viewed when viewing the television program.

The computer program may also be arranged to monitor each content provider's sponsorship of delivery of television programs to users and bill the content providers for their sponsorship of delivery of television programs to users. It could store messages and set rules provided by content providers in a database and data relating to the users in the same or another database, and determine if each user satisfies rules set by any of the content providers by accessing the first and second databases.

Figure 4:
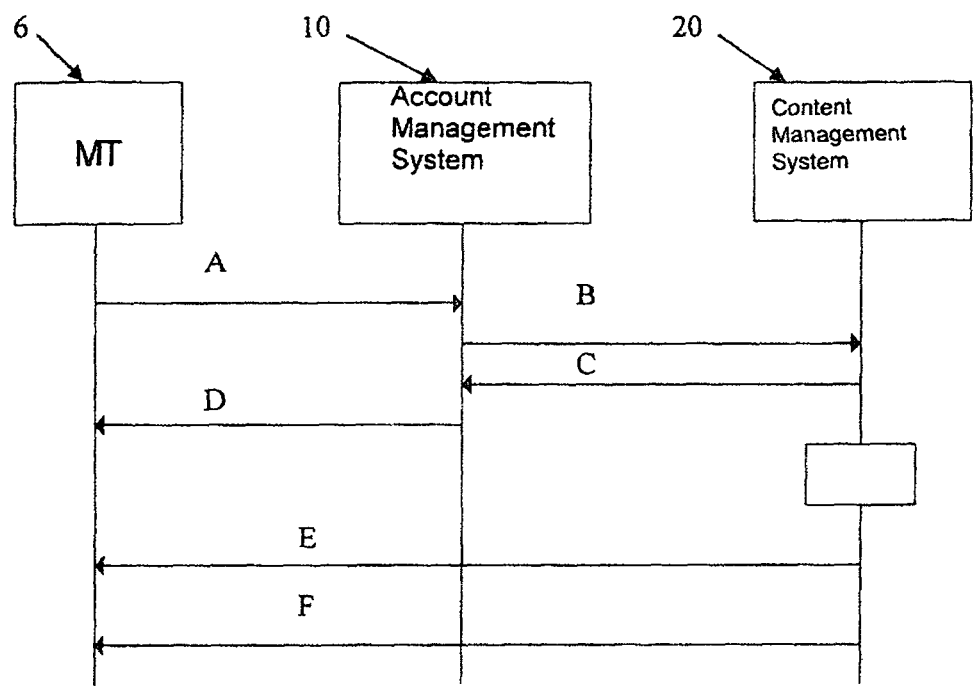
FIG. 4 shows one possible flow of messages in the combined mobile television broadcast and message system in accordance with the invention.

Referring now to FIG. 4, an exemplary message flow in the system shown in FIG. 3 is illustrated. Initially, there is a message A from the user's mobile terminal (MT 6) to the account management system 10 indicating that the user will start, is about to start or has started to watch a specific, potentially sponsored television channel. The message can refer to a specific message originating from the mobile terminal 6 containing information about which channel is being watched (i.e., which message generation can be performed by an application or computer program in the mobile terminal 6) or the message can refer to a request to download DRM keys associated with the particular television channel or possibly a particular television program on a specific channel.

This initial message from the mobile terminal 6 will trigger a further message B from the account management system 10 to the content management system 20, if the initial message was sent to the account management system 10. As an alternative, the initial message may be directed from the mobile terminal 6 directly to the content management system 20, thereby consolidating messages A and B.

In one embodiment, there is an answer to message B from the content management system 20, namely message C, indicating that it is appropriate to deliver DRM keys and/or indicating the parameters of the DRM key. These parameters might include one or more permitted watching times, an expiration time of the delivered, sponsored DRM keys and date of the delivered sponsored DRM keys, and possibly other parameters relating to use of the television program.

Upon receipt of message C, account management system 10 will deliver keys to the mobile terminal 6, for DRM related content, this being message D. For free content and a mobile terminal 6 having an application or computer program which sends information to account management system 10, there is not necessarily any communication from account management system 10 to the mobile terminal 6, since DRM keys are not needed to watch the television program. The message D from account management system 10 to the mobile terminal 6 might initiate, or be the result of, a scheduling process in the content management system 20. This scheduling process could state parameters and timing of the message(s) to be sent to mobile terminal 6, i.e., messages E and F, and/or parameters and timing of messages to be presented to the user at their mobile terminal 6, independent of and following the delivery thereof. The parameters and timing of the delivery of the messages may be relative to delivery of the DRM keys to the user's device, relative to the start of use of the television program by the user's device, relative to use of the television program, and/or relative to a duration of validity of the DRM keys.

Thus, one example of the scheduling of messages could be the sending of a flash SMS-based message from content management system 20 every fifteen minutes after the delivery of the DRM keys to the user's mobile terminal 6 or sending a message every fifteen minutes after the user's mobile terminal 6 indicates that the user is watching the television program for which the DRM keys have been provided. Another example of the scheduling of messages could be to always send one message immediately after delivery of the DRM keys in order to ensure that the user is really watching the display of the mobile terminal 6.

Yet another example of the scheduling of messages could be to initiate the scheduling process to send a MMS message to the users every thirty minutes after receiving an indication that a specific television channel is being watched.

Another example of the scheduling of messages could be to send a logo to be embedded into the television channel to be used after receiving a message that that television channel is being watched. The message in this case is the display of the logo on the television program being watched on that channel.

Still another example of the scheduling of messages could be the sending of a message in a periodic manner, a predetermined or random period, for the duration of the validity of the DRM keys. This embodiment enables a message or promotional campaign including for example, delivery of a monthly subscription to users for free, and then sending a daily message to each user of the type "Remember to watch channel xx it is sponsored to you by product yy" or "You still can watch channel xx for 25 days, thanks to product yy".

In the context of this specification, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

The term "DRM keys" as used herein can refer to content protection in which the actual content viewing and/or rendering and/or storing to a mobile terminal is restricted and/or controlled by DRM keys. The term "DRM keys" can also refer to transport protection in which the keys enable reception of Internet Protocol packets, for IP traffic being arranged to be secured by means such as IP security. Alternatively, the term "DRM keys" can refer to conditional access keys used to decrypt transport stream packet and related data of the DVB transmission.

The term "broadcast" can also include cellular broadcast using for example Multimedia Broadcast Multicast Service (MBMS) over Wideband Code Division Multiplex Access (WCDMA) or using technologies such as Digital Audio Broadcast (DAB), ISDB-T (Integrated Services Digital Broadcast Terrestrial), MediaFlo of Qualcomm, FM radio, RDS functionality of FM radio, satellite broadcast, Wireless local area networks, etc, and other networks capable of delivering television, video, audio, and/or other digital data (like files, applications, software, pictures, maps, location information, tags about the locations) to mobile terminals.

The term "television program" is generally used above. However, the scope of the invention is not limited to television programs. The invention can be used also in a similar manner as described above to allow access to, for example, television channels, movies if considered distinct from television programs, a set of television channels, a bundle of television channels, a bundle of television programs such as episodes of a common program, satellite radio systems, DAB radio, FM radio, systems delivering data, systems delivering applications, systems delivering data for applications such as browsers, system delivering map data for map applications, systems delivering video, systems delivering audio and combinations thereof. This listing is not meant to be exhaustive but only illustrative, and the scope of the invention is meant to include any content which is deliverable to a multimedia device. All of the foregoing will be considered and encompassed by the term "content" as used herein. From the business model point of view content provider, broadcast network operator, access network operator, message system operator, DRM keys provider, the content provider may or may not be a single party having a business interest, ownership, control of one or more of the blocks of the system. One example of such could be that the DRM keys are provided to recipients by a content provider which has purchased those first from content owner(s).

In general, mobile marketing and advertising can be divided into the following four categories: mobile marketing, mobile advertising, mobile direct marketing and mobile customer relations management (CRM). The present invention in any of its forms discussed above is applicable to all categories.

Mobile marketing is commonly considered as the systematic planning, implementing and control of a mix of business activities intended to bring together buyers and sellers for the mutually advantageous exchange or transfer of products or services where the primary point of contact with the recipient is via their mobile device.

Mobile advertising is commonly considered as the paid, public, non-personal announcement of a persuasive message by an identified sponsor as well as the non-personal presentation or promotion by a firm of its products to its existing and potential customers where such communication is delivered to a mobile multi-media device, mobile telephone or other mobile device. Examples of mobile advertising include, but are not limited to: Wireless Application Protocol (WAP) Banner ads, mobile search advertising, mobile video bumpers, and interstitial ads in or on device portals.

Mobile direct marketing is commonly considered a sales and promotion technique in which promotional materials are delivered individually to potential customers via the potential customer's mobile multi-media device, mobile telephone or other mobile device. Examples of mobile direct marketing include the sending of Short Message Service (SMS), Multimedia Message Service (MMS) or Wireless Application Protocol (WAP) push messages, Bluetooth messaging and other marketing to mobile telephones or other mobile devices.

Mobile customer relation management is commonly considered as a combination of all the foregoing in a manner that establishes a long-term, engaging relationship between the customer and the marketing or promoting company.

A system for managing distribution of content to at least one portable multi-media device is capable of accessing the content and communicating, and comprises:

an account management system arranged to manage requests for content from the at least one device and to manage communications to and from the at least one device; and a processing system communicatively coupled to said account management system and arranged to analyze requests for content relative to information about a user of each of the at least one device in order to determine whether resource usage associated with delivery of content to each user can be offset by a preallocated amount of resource usage, responsive to a determination that the resource usage required for said delivery of content can be offset against said preallocated amount of resource usage, the processing system is arranged to determine parameters for delivery of at least one message to that user's device and/or presentation of the at least one message at the user's device.

An example of an account management system is a mobile content system and an example of a processing system is an allocation system.

A system for managing access to content for use on multimedia devices capable of using such content and communicating, comprises:

a mobile content system which processes requests from users for using content at their devices and provides the content to said devices via a broadcast network; and an allocation system which is arranged to allocate a preallocated amount of resource usage for delivery of messages to said devices, said mobile content system and said allocation system being integrated to require exposure to messages as a condition for use of the content and to enable the resources required for delivering content to said devices to be offset against said preallocated amount of resource usage.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method, comprising:
receiving, by a processor, from a user device, a request to use content on the user device, wherein the content was delivered to the user device via a broadcast network and use of the content is associated with a usage charge;

analyzing, by the processor, data relating to a user of the user device and the requested content to determine whether rules set by a content provider are satisfied, wherein the rules dictate conditions upon which the content provider will sponsor the usage charge and the user receives an advertisement from the content provider;

upon a determination that the rules set by the content provider are satisfied by the user of the user device, sending, by the processor, the advertisement to the user device via a cellular network and debiting the usage charge from an account associated with the content provider, wherein the cellular network is different than the broadcast network;

enabling use of the requested content by the user device; and initiating, upon enablement of the requested content, a scheduling process that dictates parameters for sending the advertisement to the user device.

2. The method of claim 1, wherein the content requires a digital rights management key to enable use thereof and the enabling comprises sending the digital rights management key to the user device.

3. The method of claim 1, wherein the scheduling process dictates that the advertisement be sent while the content is being used by the user device.

4. The method of claim 3, wherein the scheduling process dictates a time interval between the advertisement and a second advertisement being sent.

5. The method of claim 1, wherein the scheduling process dictates that the advertisement be sent immediately after enabling the content.

6. The method of claim 1, further comprising:
receiving, from the user device, a response to the advertisement, wherein the analyzing further comprises analyzing the response to determine whether the rules set by the content provider are satisfied.

7. A system, comprising:
a processor; and
memory containing instruction that, when executed, cause the processor to:
receive, from a user device, a request to use content on the user device, wherein the content was delivered to the user device via a broadcast network and use of the content is associated with a usage charge;
analyze data relating to a user of the user device and the requested content to determine whether rules set by a content provider are satisfied, wherein the rules dictate conditions upon which the content provider will sponsor the usage charge and the user receives an advertisement from the content provider;
upon a determination that the rules set by the content provider are satisfied by the user of the user device, send the advertisement to the user device via a second cellular network and debit the usage charge from an account associated with the content provider, wherein the second cellular network is different than the broadcast network;
enable use of the requested content by the user device; and
initiate, upon enablement of the requested content, a scheduling process that dictates parameters for sending the advertisement to the user device.

8. The system of claim 7, wherein the content requires a digital rights management key to enable use thereof and the enabling comprises sending the digital rights management key to the user device.

9. The system of claim 7, wherein the scheduling process dictates that the advertisement be sent while the content is being used by the user device.

10. The system of claim 9, wherein the scheduling process dictates a time interval between the advertisement and a second advertisement being sent.

11. The system of claim 10, wherein the scheduling process dictates that the advertisement be sent immediately after enabling the content.

12. The system of claim 7, wherein the instructions further cause the processor to:
receive, from the user device, a response to the advertisement, wherein the analyzing further comprises analyzing the response to determine whether the rules set by the content provider are satisfied.

13. A non-transitory computer-readable medium containing instructions that, when executed by a computing device, cause the computing device to:
receive, from a user device, a request to use content on the user device, wherein the content was delivered to the user device via a broadcast network and use of the content is associated with a usage charge;
analyze data relating to a user of the user device and the requested content to determine whether rules set by a content provider are satisfied, wherein the rules dictate conditions upon which the content provider will sponsor the usage charge and the user receives an advertisement from the content provider;
upon a determination that the rules set by the content provider are satisfied by the user of the user device, send the advertisement to the user device via a second cellular network and debit the usage charge from an account associated with the content provider, wherein the second cellular network is different than the broadcast network;
enable use of the requested content by the user device; and
initiate, upon enablement of the requested content, a scheduling process that dictates parameters for sending the advertisement to the user device.

14. The non-transitory computer-readable medium of claim 13, wherein the content requires a digital rights management key to enable use thereof and the enabling comprises sending the digital rights management key to the user device.

15. The non-transitory computer-readable medium of claim 13, wherein the scheduling process dictates that the advertisement be sent while the content is being used by the user device.

16. The non-transitory computer-readable medium of claim 15, wherein the scheduling process dictates a time interval between the advertisement and a second advertisement being sent.

17. The non-transitory computer-readable medium of claim 13, wherein the scheduling process dictates that the advertisement be sent immediately after enabling the content.

18. The non-transitory computer-readable medium of claim 13, wherein the instructions further cause the computing device to:
receive, from the user device, a response to the advertisement, wherein the analyzing further comprises analyzing the response to determine whether the rules set by the content provider are satisfied.

* * * * *